Dec. 5, 1939.  A. GUERRA  2,182,124
TOASTER
Filed Dec. 13, 1938  2 Sheets-Sheet 1
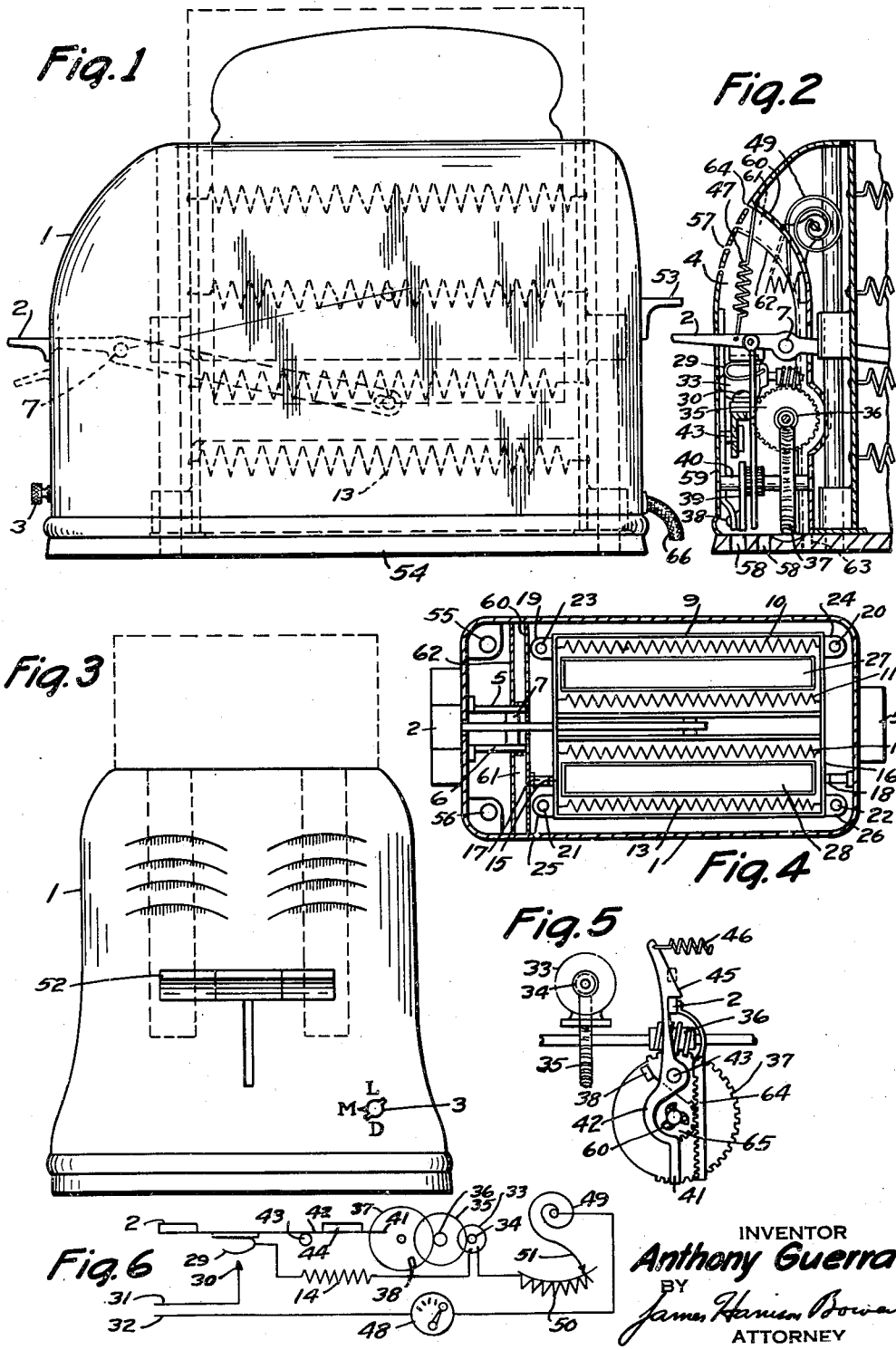
INVENTOR
Anthony Guerra
BY
James Harrison Bowen
ATTORNEY Dec. 5, 1939.  A. GUERRA  2,182,124
TOASTER
Filed Dec. 13, 1938  2 Sheets-Sheet 2
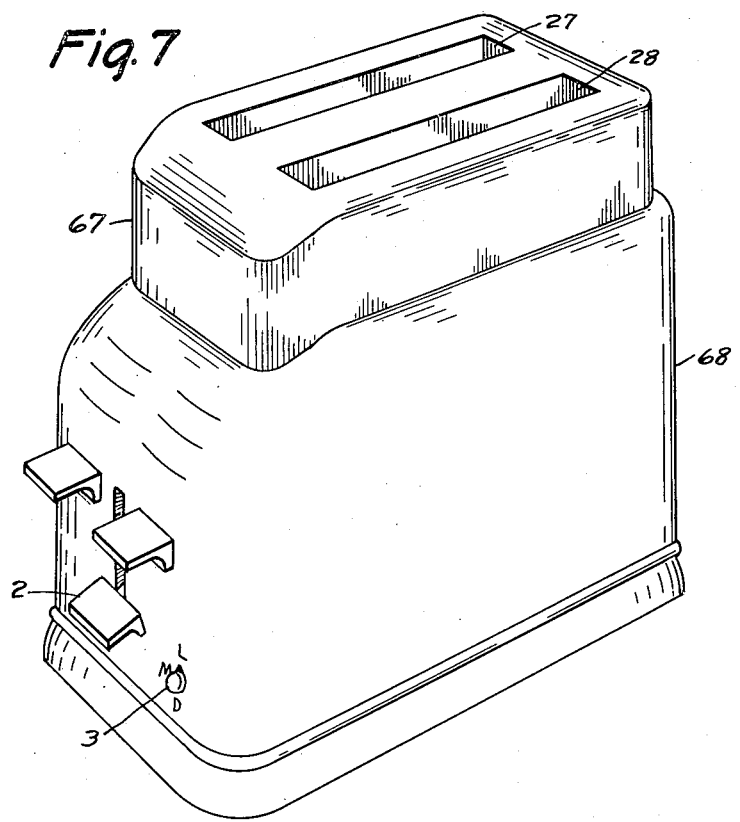
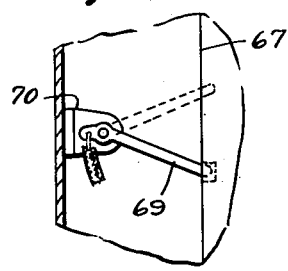
INVENTOR
Anthony Guerra
BY
James Hanson Bowen
ATTORNEY Patented Dec. 5, 1939

2,182,124

UNITED STATES PATENT OFFICE 2,182,124

TOASTER

Anthony Guerra, Hackensack, N. J.

Application December 13, 1938, Serial No. 245,343

1 Claim. (Cl. 219—19)

The purpose of this invention is to provide an improvement in toasters of the type exposing the toast, in which the toast remains in a stationary position and the toasting elements move upward surrounding the toast, and then, when the toast is made, drop downward, automatically exposing the finished toast.

The invention is a toaster having a casing with bread receiving openings at the top, and a carriage containing the heating elements surrounding said bread receiving openings, with the carriage operated by a lever at the front, and the parts are so arranged that, as the lever is pressed downward, it raises the toasting or heating elements and starts the operating mechanism which operates until the toast is made, and then the operating mechanism automatically shuts off the current and moves the toasting elements downward.

Toasters have been provided of various types and designs, and some move the toast upward when finished, however, as the upward mechanical movement is objectionable, it has been found desirable to reverse the operation wherein the slices of bread or toast remain in a stationary position, and the parts are moved upward manually and then downward automatically when toasting is completed.

The object of this invention is, therefore, to improve toasters of this type by providing bread holding elements and toasting elements in which the upper parts of the bread and toast extend upward above the casing, and the toasting elements move upward, toast the bread, and then return.

Another object is to provide a toaster in which the bread and toast remain in a stationary position, and, at the same time, the upper part of the toast is automatically exposed after it is toasted so that it may readily be withdrawn.

And a further object is to provide an automatic toaster in which the toast extends upward above the casing, and, at the same time, remains stationary, which is of a simple and economical construction.

With these ends in view the invention embodies a toaster having a casing, heating elements, stationary compartments for slices of bread, in which the upper ends of the bread extend upward above the casing, means whereby the heating elements are manually elevated to the toasting position, said means also completing a circuit through the heating elements and operating mechanism, means regulating the amount of current passing through the device, and means reducing the amount of current after the device becomes hot.

Other features and advantages of the invention will appear from the following description taken in connection with the drawings, wherein:

Figure 1 is a view showing a side elevation of the toaster.

Figure 2 is a part section showing the operating mechanism details.

Figure 3 is a view showing a front elevation of a toaster.

Figure 4 is a sectional plan with parts omitted.

Figure 5 is a detail showing a front view of the operating mechanism in which parts are omitted, and parts diagrammatically illustrated.

Figure 6 is a view showing the wiring diagram.

Figure 7 is a perspective view showing the heating element compartment in the elevated or toasting position.

Figure 8 is a detail showing an alternate type of contact of the movable elevating element.

In the drawings the toaster is shown as it may be made, wherein numeral 1 indicates the casing, numeral 2, the operating lever, and numeral 3, a knob adjusting a rheostat for controlling the motor speed.

The case 1 may be of any type or design, and the parts may be arranged in any manner, however, it is preferred to provide a compartment 4 at the front in which substantially all of the operating mechanism is housed, and the lever 2 is pivotally mounted in this compartment in bearings 5 and 6 on a pin 7, with the inner end extending inward to a point 8 where it is attached to the center of a carriage 9 in which heating elements 10, 11, 12 and 13 are mounted. All of these elements are illustrated in the diagram in Figure 6 by the coil 14, and the ends are connected to the ends 15 and 16 of the carriage 9, and this is provided with any suitable contacting means whereby a current may pass through the heating elements, however, in Figure 4 a brush switch 17 is illustrated at one end and a similar switch 18 at the opposite end which engage the members 15 and 16 with a sliding contact, thereby supplying a current to the heating elements through the ends 15 and 16. The carriage 9 is mounted upon vertical rods 19, 20, 21 and 22, through bearings 23, 24, 25 and 26, and the bearings are made of fibre or any suitable insulating material, thereby insulating the ends 15 and 16 from the base and casing.

It will be understood, however, that the heating elements may be mounted in any other manner, any other means may be provided for completing a current therethrough, and any other insulating means may be used.

In the design shown, the lever 2 may be pressed downward to the position indicated in dotted lines in Figure 1, and, as this is pressed downward, the opposite end, at the point 8, will move upward, thereby elevating the entire carriage 9 to a position indicated by the dotted lines shown in Figure 1, in which it will completely enclose slices of bread so that, with slices of bread placed in the compartments 27 and 28, they may be toasted, and, after they are toasted, the carriage will automatically drop downward, leaving the upper ends of the pieces of toast extending upward, as shown in Figure 1. It will be noted that the pieces of toast or slices of bread remain permanently in this position with their upper ends extending upward.

As the lever 2 is pressed downward, a contact 29 thereon engages another contact 30, thereby completing a circuit as shown in Figure 6 from a source of current supply through wires 31 and 32, and this circuit is completed through the heating elements 10, 11, 12 and 13, as illustrated at 14, and, at the same time, through a motor 33 which rotates gears 34, 35, 36 and 37, and, after the device has been operating the desired period of time, a lug 38 operated by the gear 37 through an arm 39 on the shaft 40 engages the end 41 of a lever 42 pivotally mounted at the point 43, and thereby operates a mercury switch 44 which automatically breaks the complete contact, breaking the circuit through the heating elements and motor. This action is illustrated diagrammatically in Figures 5 and 6, and, in Figure 5, the upper end of the lever 42 is formed with a latch 45 which is forced over the lever 2 by a spring 46 when the lever 2 is moved downward, and, when the lug 38 engages the end 41 of the lever 42, it moves the latch 45 away from the lever 2, and a spring 47 returns the lever 2 to the original or starting position and, at the same time, assists the gravity action in lowering the carriage 9 with the heating elements therein.

The device may also be provided with a rheostat 48 which may be controlled by the knob 3 to set the circuit to light, medium or dark, or any intermediate position.

The circuit is also provided with a thermostat 49 engaging a resistance 50, and the thermostat 49 is positioned outside of the compartment 4, with the contacting point extending through the wall thereof so that it will be influenced by the heat of the toaster or from the heating elements, and, as the temperature of the toaster increases, this device moves a contact point 51 along the resistance 50, gradually cutting out the resistance, and thereby speeding up the motor so that when the device is cold, at which time it would obviously take longer to toast the bread, the motor will operate at a slower speed, and, after the device is hot, the speed thereof will increase as it will take less time to toast the bread.

The lever 2 forms part of the handle 52 at the front, and a corresponding handle 53 may be placed at the back, although it will be understood that the casing may be provided with handles of any type, and they may be arranged at any point or points. The casing may also be provided with a base 54 which may be detachably held thereto by screws 55 and 56 so that it may readily be removed for cleaning.

The forward part of the casing is provided with slits or louvers 57 whereby the heated air in the compartment 4 may escape, providing a current of air for keeping the motor cool. The base may also be provided with openings 58 so that the cool air may enter the lower part of this compartment.

This compartment is formed between the front 59 of the casing and a zinc partition 60, separating the compartment from the interior of the toaster so that the operating mechanism will be protected from the heat of the heat elements.

The partition 60 is preferably made of zinc, and, with the exception of the central part where the mechanism is located, this partition may be double, providing a vacuum chamber 61 between the inner section 62 and the plate 60, however, it will be understood that only one partition may be used, or a double partition may be provided across the device with a vacuum chamber therein, insulating the operating parts from the heat of the toaster.

The lower end of the chamber between the two partitions may also be provided with openings 63 at the base and louvers 64 at the upper end for circulation.

Any means may be provided for returning the operating parts to the starting position, however, in the design shown, a rack 64 is attached to the lever 2, and this engages a gear 65 on the shaft 40 which automatically moves the lug 38 backward to the starting position as the lever 2 moves upward. The gear 65 may be provided with clutch members permitting an upward movement without moving the gear 37 or shaft 40.

The current may be supplied through the wire 66 in which the wires 31 and 32 may be incorporated, and this may extend to any suitable source of electrical current.

It will be understood that changes may be made in the construction without departing from the spirit of the invention. One of which changes may be in the use of a casing of any other type or design, another may be in the use of other means for supporting slices of bread, another may be in the use of other means for making and breaking the contacts, and still another may be in the use of other means for providing a sliding connection between the source of current and the heating elements.

The construction will be readily understood from the foregoing description. In use the toaster may be provided as shown and described, and it will be noted that with slices of bread placed in the openings to the compartments 27 and 28 the lever 2 may be pressed downward, and, as this is pressed downward, the circuit will be completed either through the switch indicated by the contacts 29 and 30, or through the mercury switch, and, at the same time, the compartments with the heating elements will be elevated to the position indicated by the dotted lines in Figure 1, and as shown in Figure 7. The slices of bread will, therefore, be completely surrounded by the heating elements, and will, therefore, be toasted, and, after the slices of bread are toasted, the heating element, as indicated by the numeral 67, in the design shown in Figure 7, will automatically drop downward; as, when the circuit is completed by pressing the lever 2 downward, a circuit is completed through the motor 33 which will rotate the gear 37 until a lug 38 engages the lower end of the lever 42, and this will release the lever 2, permitting the element 67 to drop downward, and the time the element remains upward or in the toasting position may be controlled by the button 3. However, the toasting time is also regulated by the thermostat 49 as, as the toaster becomes hot, the end of the element 49 passes across the resistance 50 eventually cutting out the resistance as indicated in Figure 6, thereby speeding up the motor and reducing the toasting time.

The toaster illustrated in Figure 7 is slightly different from that shown in Figure 1, in that the element 67 enclosing the heating elements extends outward substantially to the shell 68 of the toaster, and it will be understood that either the elevating element or shell of the toaster may be of any suitable design or arranged in any manner; and, in this design, it may also be necessary to provide a movable contact, as illustrated in Figure 8, instead of the contact 17 shown in Figure 4, as, with the contact shown in Figure 8, an arm 69 pivotally mounted on an insulating bearing 70 may engage the elevating element 67, providing a continuous contact, and a similar contact may be provided at the opposite end, eliminating the necessity of grounding the contacts to the heating element.

It will also be understood that the details, such as the electric contacts and other operating parts, are only typical, as any means may be provided for elevating and lowering the heating elements, or for making the contacts, or for regulating the toasting time.

Having thus fully described the invention, what I claim as new, and desire to secure by Letters Patent, is:

A toaster of the automatic type having heating elements positioned to toast both sides of slices of bread placed in the toaster and also of the type in which parts of the slices of bread and toast extend above the upper surface of the toaster before and after toasting; said toaster characterized by, a unitary casing having a continuous stationary wall extending from the base to the upper surface thereof in which the toasting and operating elements are mounted, and a secondary vertically slidable unit completely enclosed in the said unitary casing with the toaster in the inoperating position and elevated above the upper surface of said casing to completely surround slices of bread in the toaster in the toasting position, said unitary casing having a compartment at one end for the operating parts, and said operating parts comprising, a lever fulcrumed in said compartment with one end extending beyond the compartment and casing and the other attached to and positioned to elevate said secondary unit with the extending end moved downward, a circuit closing switch positioned to be closed by said lever as the lever is moved downward, a latch holding said lever, a motor and timing gear, with the motor connected in said circuit and the timing gear positioned to release said latch, means automatically increasing the speed of the motor to shorten the toasting time when the device is heated, means manually controlling the motor speed to control the toasting time, and tracks in the unitary casing forming guides for the vertically movable secondary unit, said compartment insulated from the remaining part of the casing and having ventilated openings in the base and upper part thereof.

ANTHONY GUERRA.